UNITED STATES PATENT OFFICE.

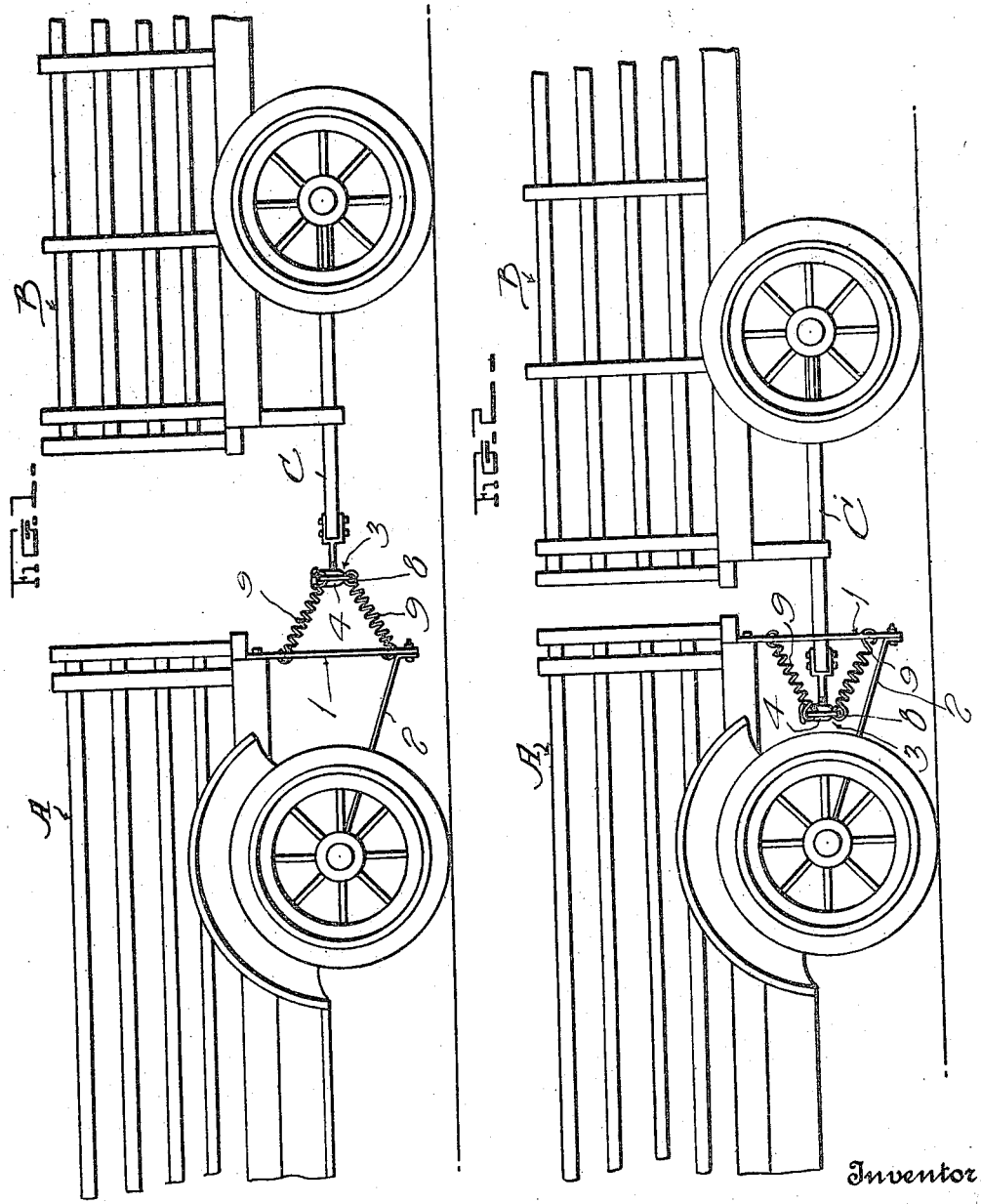

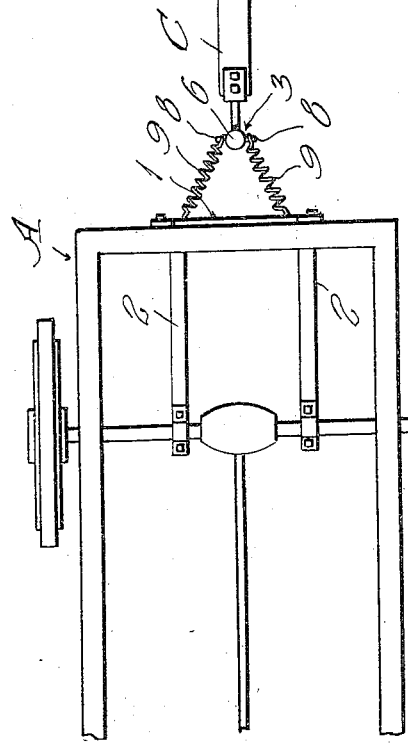
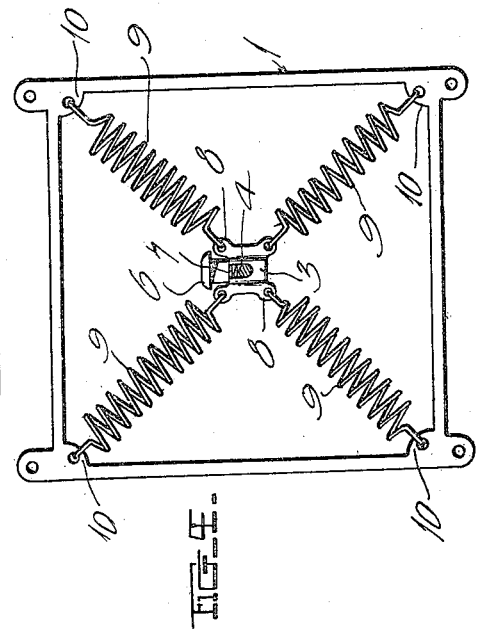
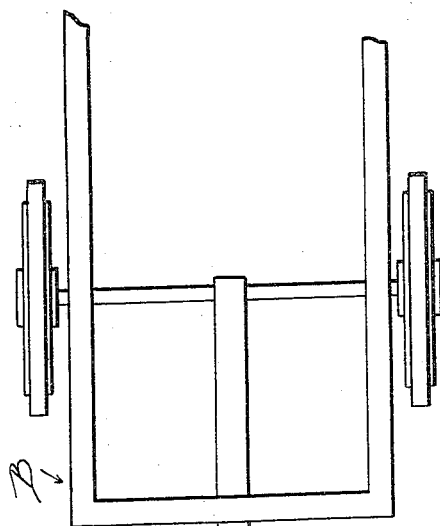
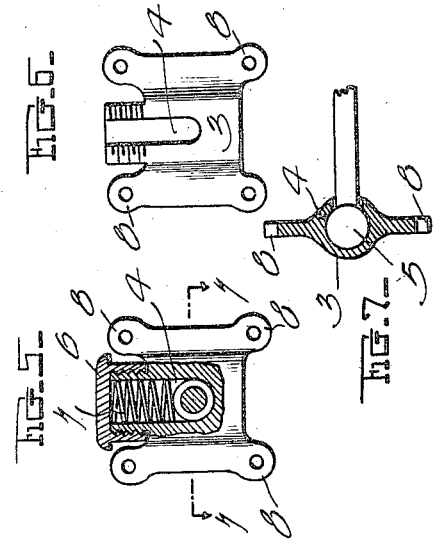

ALFRED N. BESSESEN, OF MINNEAPOLIS, MINNESOTA.

DRAFT APPLIANCE.

1,259,205.

Specification of Letters Patent.

Patented Mar. 12, 1918.

Application filed May 24, 1917. Serial No. 170,702.

*To all whom it may concern:*

Be it known that I, ALFRED N. BESSESEN, a citizen of the United States, residing at Minneapolis, in the county of Hennepin and State of Minnesota, have invented certain new and useful Improvements in Draft Appliances; and I do declare the following to be a full, clear, and exact description of the invention, such as will enable others skilled in the art to which it appertains to make and use the same.

This invention relates generally to vehicles, and more particularly to certain new and useful improvements in draft appliances which are especially adapted for use in connection with motor vehicles and trailers for the same.

The primary object of the invention is to provide a resilient means for attaching one end of the draw bar of a trailer to the rear end of a motor vehicle, said means permitting the draw bar to yield in all directions within certain limits to relieve undue strain upon either of the vehicles while the same are in motion, or upon starting and stopping the same.

A further object of the invention is to generally improve upon devices of this character by the provision of a comparatively simple, strong, durable and inexpensive construction, one which will be efficient and reliable in operation, and well adapted to the purpose for which it is designed.

With these and numerous other objects in view, the invention consists of certain novel features of construction, and the combination and arrangement of parts which will be hereinafter fully described and claimed.

In the accompanying drawings in which similar reference characters are used to designate corresponding parts throughout the several views:

Figure 1 is a side elevation of the adjacent ends of two vehicles, showing a device constructed in accordance with this invention applied thereto and illustrating the position of the springs when one vehicle is pulling the other;

Fig. 2 is a similar view illustrating the position of the springs when one vehicle is pushing the other;

Fig. 3 is a top plan view of the adjacent ends of two vehicles with the invention applied thereto;

Fig. 4 is a front view of the frame which is attached to one of the vehicles;

Fig. 5 is a vertical sectional view of the socket which is yieldably connected to the frame;

Fig. 6 is a front view of the socket; and,

Fig. 7 is a horizontal sectional view taken on the plane indicated by the line 7—7 of Fig. 5.

Referring more particularly to the drawings, the letter A represents a motor vehicle adapted to draw a trailer B having a tongue or draw bar C. Rigidly attached to the rear end of the motor vehicle A in any suitable manner is a supporting body which preferably partakes of the form of an open square-shaped frame 1. The upper side of the frame 1 is here shown as being bolted to the rear end of the body of the vehicle A, while the lower side of said frame is connected to braces 2, which in turn are connected in any suitable manner to the rear axle housing of the vehicle. It is to be understood, however, that other means may be employed for connecting the frame 1 to the vehicle than that herein shown.

The reference numeral 3 designates a central member having a socket 4 which receives the ball-shaped head 5 carried by the free end of the draw bar C. This socket 4 is provided with a cap 6 threaded to the open end of the same to permit the ball 5 to be removed therefrom. A spring 7 disposed within the socket and having its upper end bearing against the cap, prevents the ball 5 from rattling within the socket, but permits it to move in the same when the draw bar C is moved with respect to the frame 1.

Extending from the edges of the member 3 are attaching ears 8 to which is connected one of the ends of a plurality of coil springs 9 which may be either compression or tension springs. These coil springs 9 extend radially at spaced distances from the member 3 and have their other ends connected to attaching ears 10 arranged at the corners of the frame 1. By this construction it may be seen that the member 3 carrying the socket 4 in which is disposed the free end of the draw bar C may yield in all directions with respect to the frame, and thus undue strains upon either the vehicle A or the trailer B while these vehicles are either in motion or when starting or stopping the same, are absorbed.

It is obvious that if desired, the frame 1 can be attached to the trailer and the draw bar can be attached to a motor vehicle or the different parts of the device used in other manners.

Various other changes in form, proportion, and in the minor details of construction may be resorted to without departing from the spirit of this invention, and hence I do not wish to limit myself to the precise construction herein shown and described.

I claim:—

1. In a device of the character described, the combination of an open frame adapted to be rigidly attached to a vehicle, a central member provided with means for connection to a draw bar, and coil springs having one of their ends connected to said frame and their other ends connected to said member.

2. In a device of the character described, the combination of an open frame adapted to be rigidly attached to a vehicle, a central member provided with means for connection to a draw bar, and coil springs having one of their ends connected to said member and their other ends connected to said frame, said coil springs extending radially from said member and being spaced equally apart.

3. In a device of the character described, the combination of an open multi-sided frame adapted to be rigidly attached to a vehicle, a central member provided with means for connection to a draw bar, and coil springs having one of their ends connected to said members and their other ends connected to said frame at the corners thereof.

4. In a device of the class described, the combination of a supporting body adapted to be rigidly attached to a vehicle, a socket, spring means for connecting said socket to said supporting body and permitting it to yield in all directions, and a draw bar having a headed element for detachable engagement with said socket.

In testimony whereof I have hereunto set my hand in the presence of two subscribing witnesses.

ALFRED N. BESSESEN.

Witnesses:
LYNN FOX,
H. J. BESSESEN.

Copies of this patent may be obtained for five cents each, by addressing the "Commissioner of Patents, Washington, D. C."